(12) United States Patent
Slootweg et al.

(10) Patent No.: US 8,465,813 B2
(45) Date of Patent: Jun. 18, 2013

(54) ARTIFICIAL LAWN FOR ARTIFICIAL GRASS SPORTS FIELD

(75) Inventors: Geurt Bastiaan Slootweg, Enschede (NL); Frederik Jan Van Der Gaag, Nijverdal (NL); Marinus Hendrikus Olde Weghuis, Oldenzaal (NL)

(73) Assignee: Ten Cate Thiolon, B.V. (NL)

( * ) Notice: Subject to any disclaimer, the term of this patent is extended or adjusted under 35 U.S.C. 154(b) by 566 days.

(21) Appl. No.: 12/311,987

(22) PCT Filed: Oct. 23, 2007

(86) PCT No.: PCT/NL2007/000269
§ 371 (c)(1), (2), (4) Date: Apr. 29, 2009

(87) PCT Pub. No.: WO2008/051072
PCT Pub. Date: May 2, 2008

(65) Prior Publication Data
US 2010/0021660 A1    Jan. 28, 2010

(30) Foreign Application Priority Data

Oct. 23, 2006   (NL) .................................... 1032724

(51) Int. Cl.
*E01C 13/08*   (2006.01)
*D05C 17/02*   (2006.01)

(52) U.S. Cl.
USPC ................................ 428/17; 428/95; 428/97

(58) Field of Classification Search
USPC .................. 428/17, 95, 97, 373, 374
See application file for complete search history.

(56) References Cited

U.S. PATENT DOCUMENTS

| 2,725,835 A | * | 12/1955 | Mather ............................. 112/1 |
| 2,866,206 A | * | 12/1958 | Gebert ............................ 428/95 |
| 3,611,699 A | | 10/1971 | Wininger, Jr. et al. |
| 3,686,046 A | * | 8/1972 | Crowley ........................ 156/72 |
| 3,694,873 A | * | 10/1972 | Crowley ........................ 264/103 |
| 3,847,719 A | * | 11/1974 | Crowley ........................ 428/89 |
| 4,426,415 A | * | 1/1984 | Avery ............................ 428/17 |

(Continued)

FOREIGN PATENT DOCUMENTS

| JP | 03042345 A | * | 2/1991 |
| JP | 07-155280 | | 6/1995 |

(Continued)

*Primary Examiner* — Cheryl Juska
(74) *Attorney, Agent, or Firm* — Olson & Cepuritis, Ltd.

(57) ABSTRACT

The invention relates to an artificial lawn, in particular for an artificial grass sports field comprising an artificial mat built up of a carrier to which artificial glass fibers are attached. The object of the invention is to provide a new type of artificial lawn, which in particular obviates the need to use an infill material, without this having an adverse effect on the playing characteristics of the sports field. According to the invention, the carrier is at least in part provided with at least one additional material component, which additional material component imposes a permanent volume increase on said part of the carrier under the influence of an external stimulus after being provided in the artificial mat. The use of an additional material component, which imposes a permanent volume increase on at least a part of the carrier, makes it possible to create an artificial lawn having an additional damping property, which has a positive effect on the playing characteristics of the sports field, such as the absorption of shocks, the restitution of energy and the vertical deformation and which furthermore reduces the number of player injuries.

15 Claims, 4 Drawing Sheets

U.S. PATENT DOCUMENTS

| | | | |
|---|---|---|---|
| 6,221,486 B1 * | 4/2001 | Soane et al. | 428/364 |
| 6,387,492 B2 * | 5/2002 | Soane et al. | 428/376 |
| 6,753,049 B2 | 6/2004 | De Vries | |
| 6,838,147 B2 * | 1/2005 | Burns et al. | 428/95 |
| 6,860,953 B1 * | 3/2005 | Grizzle et al. | 156/72 |
| 6,936,201 B2 * | 8/2005 | Desai et al. | 264/112 |
| 6,955,841 B2 | 10/2005 | Weghuis et al. | |
| 7,361,401 B2 * | 4/2008 | Desai et al. | 428/327 |
| 7,611,763 B2 * | 11/2009 | Atsma et al. | 428/97 |
| 2003/0175474 A1 * | 9/2003 | Higgins et al. | 428/95 |
| 2005/0238823 A1 | 10/2005 | Weghuis et al. | |
| 2009/0252900 A1 * | 10/2009 | Slootweg et al. | 428/17 |
| 2010/0010808 A1 * | 1/2010 | Sugiyama et al. | 704/203 |

FOREIGN PATENT DOCUMENTS

| | | |
|---|---|---|
| JP | 07-310250 | 11/1995 |
| JP | 07-329210 | 12/1995 |
| WO | WO 2008/051073 A2 | 5/2008 |

\* cited by examiner

ARTIFICIAL LAWN FOR ARTIFICIAL GRASS SPORTS FIELD

This application is the U.S. National Stage of International Application No. PCT/NL2007/000269 filed Oct. 23, 2007, the entire disclosures of which are incorporated herein by reference.

The invention relates to an artificial lawn, in particular for an artificial grass sports field comprising an artificial mat built up of a carrier to which artificial glass fibres are attached.

The invention also relates to such an artificial mat.

Synthetic materials are currently used for all kinds of purposes, in particular the use of all kinds of plastics in artificial lawns for sports field has experienced a strong growth the last few years. The development of artificial grass fibres and of artificial grass sports fields derived therefrom has expanded to such an extent that it is now possible to install artificial grass sports fields which are hardly distinguishable from natural grass sports fields as regards their appearance but in particular as regards their playing characteristics.

The last few years researchers have focussed in particular on the development of artificial grass fibres for use in artificial lawns for sports fields, taking into account in their research the fact that each individual sport has its own specific requirements as regards the subsoil and the surface properties of the material.

Standard synthetic materials that are currently used in the development of artificial grass fibres are polypropylene, polyamide and/or polyethylene. The advantage of such materials is that they can be produced at low cost and are easy to process, and that said synthetic materials can be readily processed into artificial grass fibres by stretching. Said fibres having a specific length are attached to a carrier, for example by tufting. A drawback of the present artificial grass fibres in comparison with natural grass fibres is that the risk of injury resulting from the higher frictional resistance between the players' skin and the artificial grass fibres is much greater.

This latter drawback is currently obviated to a large extent by the use of a granular infill, such as rubber or plastic grains, between the synthetic grass fibres, as is for example disclosed in WO 2005/124028. These infilled grains not only provide a softer, damping playing surface on which players are less prone to injury, therefore, but they also provide optimised playing characteristics resembling those of natural grass. The use of an infill in artificial grass sports fields has a number of drawbacks, however. Not only is the installation of such an artificial grass sports field more labour-intensive, but an infilled artificial grass sports field requires maintenance also after it has been installed.

The past few years a number of non-infill systems have been introduced as alternatives, as for example disclosed in WO 01/96664 and US 2003/099787.

Recent research has been based on combining existing techniques with new developments in order to come to a non-infill system having more easily controllable playing characteristics than the current non-infill systems. These developments in particular relate to the combining of components and fibres of different length, diameter, shape and/or made of different synthetic materials, wherein one fibre is conducive to good playing properties, such as the roll of the ball, and the other fibres provide more grip and reduce the frictional resistance or provide shock absorption and energy restitution so as to reduce the risk of injury in this way.

A suitable combination of components and techniques is based on an analysis of the construction of the overall artificial grass system, wherein the system is defined in several layers, viz. an upper layer, a middle layer and a bottom layer. Each system layer is responsible for a part of the functional properties of the overall system. The upper layer is mainly responsible for the visual aspects of the sports field, but also, for example, for enabling safe sliding tackles and the correct roll of the ball. The middle layer is responsible mainly for the players' grip on the field, the stability and the low impact shock absorption (ball bounce). In addition to that, the bottom layer is responsible mainly for the high impact absorption (player-field interaction). Furthermore, a suitable balance between shock absorption and energy restitution is an important functional requirement. These are properties which, during a later stage in the research, must be translated into techniques and components to be used.

The object of the invention is to provide a new type of artificial lawn which has improved sports-related properties, among which an improved shock absorption and energy restitution by integrating the functional characteristics of multiple system layers, which in particular obviates the need to use an infill material, without this having an adverse effect on the playing characteristics of the sports field, thereby reducing the risk of injury to the players.

According to the invention, the carrier is at least in part provided with at least one additional material component, which additional material component imposes a permanent volume increase on said part of the carrier under the influence of an external stimulus after being provided in the artificial mat. Thus it is possible to create an artificial mat, which can be produced by means of the standard production techniques and wherein the additional material component in the carrier foams and transforms into, for example, a dampening layer after the manufacture. The use of an additional material component, which imposes a permanent volume increase on at least a part of the carrier, makes it possible to create an artificial lawn having an additional damping property, which has a positive effect on the playing characteristics of the sports field, such as the absorption of shocks, the restitution of energy and the vertical deformation and which furthermore reduces the number of player injuries.

In a specific embodiment, the additional material component is preferably homogeneously distributed in the carrier so as to obtain an effective artificial lawn.

More in particular, the additional material component may be incorporated in the carrier in the form of a fibre or yarn, which can be effected in a simple manner by means of the known production techniques, such as tufting, weaving or knitting. In this case, too, it is possible to realise a well controlled homogeneous distribution of the additional material component in the carrier.

More specifically, according to the invention the additional material component may be incorporated in the carrier in the form of at least one layer, which may or may not be integrated in the rest of the carrier. This, too, leads to an improved carrier comprising a homogeneously distributed additional material component, as a result of which an effective damping layer is realised once the permanent volume increase has been imposed on the carrier.

A more functional artificial grass sports field having improved playing characteristics can be realised in that the layer of said additional material component and the layer of said further additional material component are separated by an intermediate layer.

The use of several layers, each consisting of different additional material components that impose a permanent volume increase on their part of the carrier under the influence of an external stimulus makes it possible to develop the artificial grass sports field in dependence on the type of sport to be played thereon.

It may furthermore be preferable for the carrier to be made of crosslinked materials, resulting in a prolonged life of the carrier since the carrier thus obtained exhibits an improved creep behaviour.

An even more functional embodiment of the artificial lawn according to the invention is characterised in that at least a first group of the artificial grass sports fibres is provided with at least one of the aforesaid additional material components. In this case, too, the artificial mat may be given an additional playing characteristic as a result of the permanent volume increase that is imposed on the artificial grass fibre, which furthermore reduces the risk of injury to the players.

In this embodiment, too, the additional material component may be homogeneously distributed in the artificial grass fibre.

More specifically, the artificial grass sports fibre is an extruded fibre, which makes it possible to produce said fibre by means of the known extrusion techniques.

It may furthermore be preferable if the artificial grass sports fibre is a crosslinked fibre, which prolongs the life span of the fibre since the artificial grass sports fibre thus obtained exhibits an improved splitting and wear behaviour.

It has been found to be effective to configure the additional material component according to the invention as a foam material, since this makes it possible to give the artificial mat an extra functional, for example an additional damping and resilience property.

For example, the foam material may be composed of a mixture consisting of one or several polymeric materials combined with at least one chemical blowing agent that is compatible with said mixture. Examples of chemical foam materials (also called blowing agents) suitable for this invention are Azo, Hydrazide, Carbazides, Tetrazoles, Nitroso compounds and carbonates. The process conditions and the correct blowing agent or combination of blowing agents are interdependent and must thus be selected to match one another. Catalysts may be added to the mixture, which catalysts influence the moment of activation of the blowing agents in order to thus optimise the process for obtaining a volume-increasing carrier and/or artificial grass fibre.

More specifically, the foam material has a closed cell structure after the permanent volume increase, which is preferable to an open cell foam structure. A closed cell structure has a longer life in relation to, for example, the weather conditions (for example dirt, sub-zero temperatures and moisture), so that the playing characteristics of the artificial grass sports field will remain the same irrespective of the season and the presence of dirt and also irrespective of the weather conditions.

In a special embodiment of the invention, the additional material component can impose the permanent volume increase on at least a part of the carrier under the influence of heat.

In a functional embodiment, the artificial grass sports field may according to the invention be characterised in that the artificial grass sports fibres of the first group are disposed between artificial grass sports fibres of a second group, and the artificial grass sports fibres of the first group may be disposed between artificial grass sports fibres of at least a third group.

The invention will now be explained in more detail with reference to the drawing, in which:

FIGS. 1 and 2 schematically show a few embodiments of an artificial lawn and in particular an artificial grass sports field comprising an artificial grass fibre;

Figure 1:
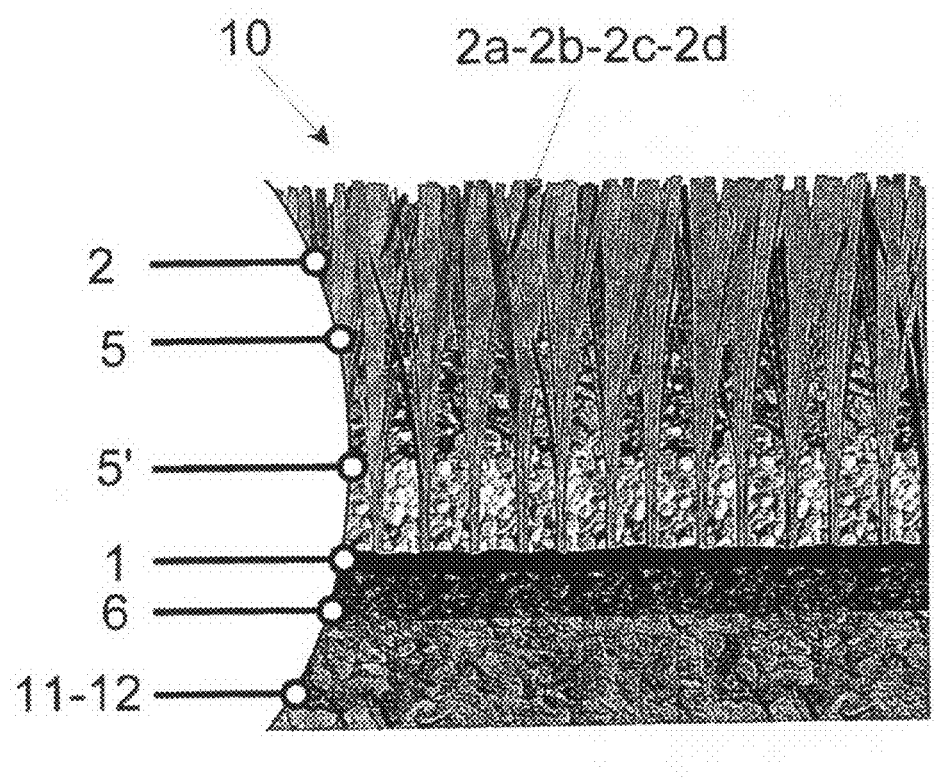
Figure 2:
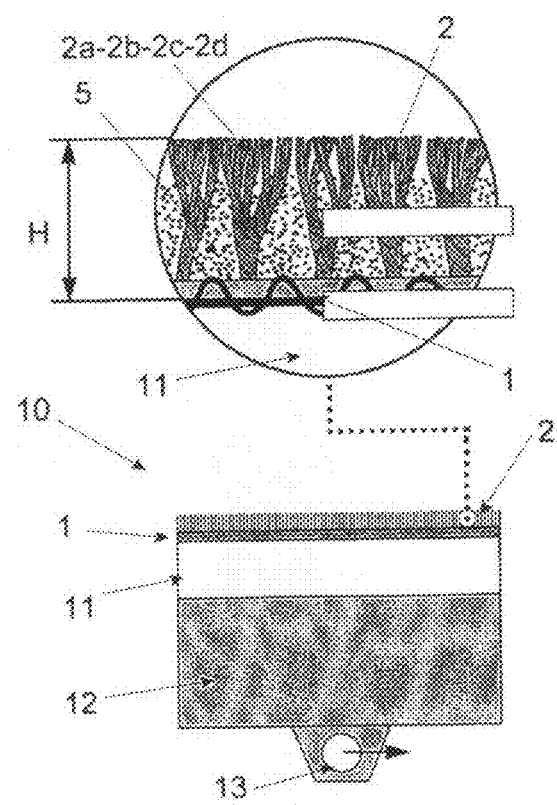

FIGS. 1 and 2 show embodiments of a known artificial lawn 10, in which a standard artificial grass fibre can be used. In both figures the artificial lawn 10 comprises a carrier 1, to which several artificial grass fibres 2 have been attached, for example by tufting.

The artificial grass fibres are generally made up of one or more artificial grass fibres 2a-2b-2c-2d-etc., which artificial grass fibres may consist of fibrillated and/or monofilament fibres, for example as described in International patent application WO2004/077914. This makes it possible to create artificial grass substantially fully resembling natural grass. Such fibres 2a-2d can be produced by means of known production techniques, such as extrusion. The individual fibres 2a-2d thus obtained, for example by extrusion, can be twined to form the artificial grass fibre 2 and subsequently be attached to the carrier 1.

In FIGS. 1 and 2 the carrier is placed on a surface having suitable sports-related properties, which surface is made up of the layers 6-11-12 and 13. The layer 11 may comprise an optional elastic layer 6 (said optional layer 6 may also form part of the carrier 1). The layers 11 and 12 form the foundation of the artificial lawn 10 and are built up of a coarse layer 11 of stones and a fine layer 12 of sand. The artificial lawn system 10 is provided with a drainage system, indicated at 13 in FIG. 2, for draining rain water.

An infill material 5 is provided between the artificial grass (sports) fibres, which infill may optionally be layered, as shown in FIG. 1, viz. a layer 5 of rubber or plastic grains and a layer 5' of sand grains.

Figure 3:
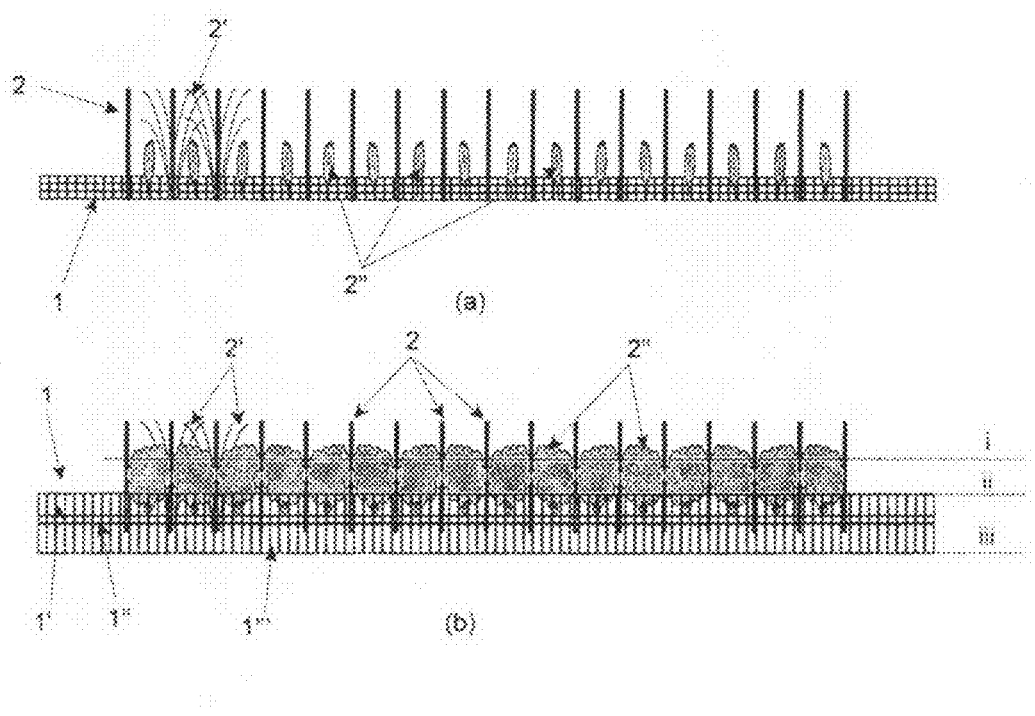
FIG. 3 is a detail view of an embodiment of an artificial grass fibre according to the invention.
Figure 4:
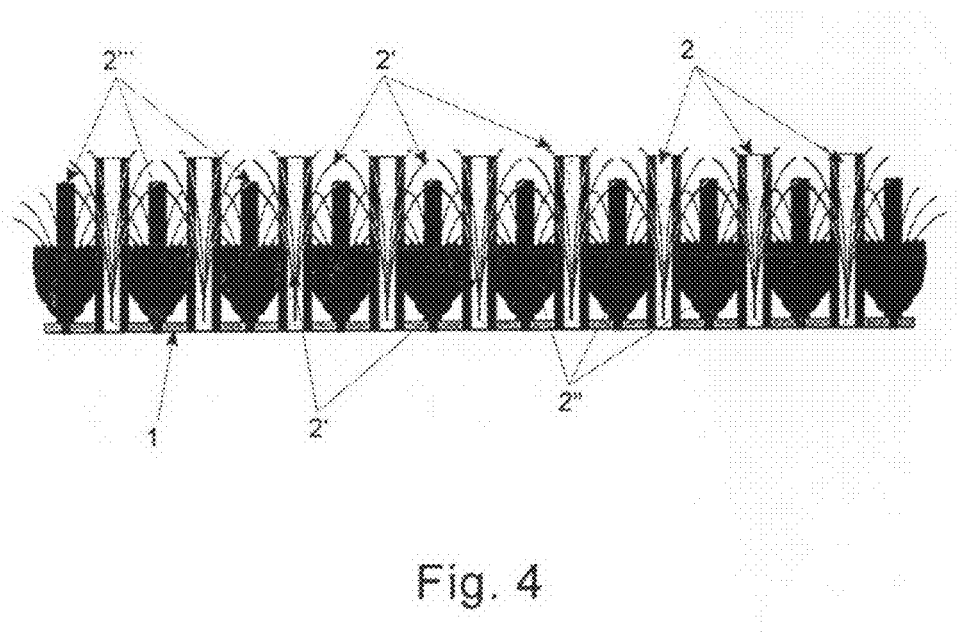
FIG. 4 is a detail view of another embodiment of an artificial grass fibre according to the invention.

FIGS. 3 and 4 show two embodiments of the artificial grass sports field according to the invention. Analogously to FIGS. 1 and 2, this embodiment comprises a carrier 1, to which several groups of artificial grass sports fibres 2, 2', 2", 2''' are attached.

According to the invention, the carrier 1 shown in FIGS. 3a and 3b is provided with an additional material component, which additional material component imposes a permanent volume increase on at least that part of the carrier 1 in which the additional material component is incorporated under the influence of an external stimulus. All this is shown more clearly FIG. 3b, in which the carrier 1 is made up of three layers 1'-1"-1'''. For a clear understanding of the invention, however, it is noted that the carrier may also be made up of one layer, which comprises the additional material component that imposes a permanent volume increase on said part of the carrier 1 under the influence of an external stimulus.

The additional material component is preferably homogeneously distributed in the carrier 1, for example in the form of a yarn, indicated as the layers 1' and 1''' in FIG. 3. Said additional material component imposes a permanent volume increase on the part of the carrier 1 in which it is incorporated under the influence of an external stimulus, for example heat. Said permanent volume increase must preferably take place after the artificial lawn has been constructed, in conformity with the situation shown in FIG. 3a. As a result of the permanent volume increase, the artificial lawn has been transformed to the situation shown in FIG. 3b.

It should be noted in this connection that in a first embodiment the additional material component is incorporated in a first layer 1' in the carrier 1, whilst in another embodiment (likewise shown in FIG. 3b) the carrier 1 is provided with a first additional material component, which is incorporated in a first layer 1', as well as with a second, additional material component, which is incorporated in a second layer 1'''. The two layers 1' and 1''' are separated from each other by means of an intermediate layer 1'''. Preferably, the intermediate layer 1''' does not comprise an integrated material component (for example in the form of yarn), so that this part of the carrier 1, in contrast to the layers 1' and 1''', does not contribute to the permanent volume increase.

In the embodiment in which only one layer 1' is incorporated in the carrier 1, a permanent volume increase is realised by using the additional material component, which additional material component may be a foam material, for example. Thus, a resilient or damping layer is formed, which obviates the need to use an additional infill material, whilst an artificial grass sports field exhibiting improved playing characteristics as regards damping and resilience is nevertheless realised. This has a positive effect in particular on the shock absorption and the energy restitution when practising sports.

If several layers 1'-1''-1''' are used, and layer 1' and layer 1''' each comprise a first additional material component and a second additional material component, it is possible to realise an artificial grass sports field comprising several damping carrier layers 1' and 1''', which also affect the playing characteristics of the sports field in a different manner, however, on the basis of the properties of the additional material components that are used.

Preferably, the additional material component is a foam material, which foam material may in particular be composed of a mixture consisting of at least one or several polymeric materials combined with at least one chemical blowing agent that is compatible with said mixture. Examples of chemical foam materials (also called blowing agents) suitable for this invention are Azo, Hydrazide, Carbazides, Tetrazoles, Nitroso compounds and carbonates. More specifically, the foam material has a closed cell foam structure, although it is also possible to use an open cell foam structure.

A closed cell structure is preferred, however, because the foamed material (i.e. after the volume increase) will thus be hardly affected by, for example, the weather conditions and dirt. A closed cell foam structure is for example insensitive to sub-zero temperatures, dirt and moisture, so that it is ensured that the playing characteristics and the playing behaviour will remain the same, also when the artificial lawn is used for playing sports in varying weather conditions.

Furthermore an embodiment of the artificial grass sports field and artificial mat is shown in which several groups of artificial grass fibres 2-2'-2'' are used, wherein the artificial grass fibres 2'' of at least a first group are likewise provided with an additional material component, which imposes a permanent volume increase on at least the artificial grass sports fibre under the influence of an external stimulus.

The two situations are shown in FIGS. 3a and 3b, with FIG. 3a showing the situation in which the artificial mat has just been constructed, whilst FIG. 3b shows the situation in which a permanent volume increase has been imposed on at least the first group of artificial grass sports fibres 2'' and on the carrier 1 under the influence of an external stimulus (for example heat), so that said first group and said carrier form additional damping layers indicated at ii and iii, wherein the artificial grass fibres 2'' of the first group are disposed between the artificial grass sports fibres 2 of a second group and the artificial grass sports fibres 2' of a third group.

It can furthermore be noted in this connection that the additional material component as incorporated into the artificial grass sports fibres 2'' is preferably the same material component as the component that is used in the carrier 1, whilst it is preferable also in this case to distribute the additional material component homogeneously in the artificial grass sports fibre.

Preferably, the artificial grass sports fibre 2'' is an extruded fibre, so that the fibre can be produced by means of the known production techniques.

In view of the intensive loads to which the artificial grass fibres 2-2'-2'' are subjected, it is preferable if in particular the artificial grass sports fibre 2'' is a crosslinked fibre. Crosslinking provides an extra strong fibre, which does not wear or split easily in the case of intensive use. It is furthermore preferable to form the carrier one of crosslinked fibres as well. In addition to that it is preferable to use an extruded fibre as the artificial grass fibre, which can thus be produced by means of simple, known techniques.

In another embodiment at least the extruded artificial grass sports fibre 2'' has been formed by co-extrusion of at least the basic synthetic material and the additional material component. Also other fibre groups may have been produced by co-extrusion, however. Thus it is possible to realise a layered artificial grass fibre by means of the co-extrusion step, with the different materials imparting different functionalities to the fibre. The basic synthetic material from which the artificial grass fibre is made thus functions to provide strength, for example, whilst the additional material component, which undergoes a permanent volume increase under the influence of an external stimulus, functions to provide damping or resilience.

The basic material (indicated "B" herein) may surround the additional material component (indicated "A") according to a BAB structure. In another embodiment, the artificial grass fibre may be built up of several layers realised by co-extrusion, wherein the additional material component is surrounded on at least two sides according to a BAB or BAC structure by two synthetic materials (indicated "B" and "C"), which may or may not be different from each other, so as to influence the surface properties of the artificial grass fibre. In yet another embodiment, the additional component A surrounds the basic material B on two or more sides according to an ABA structure, in order to thus create a strengthened, foamed artificial grass sports fibre.

According to the invention, the artificial grass fibre 2'' can undergo the permanent volume increase under the influence of heat (the external stimulus). This makes it possible to build up the artificial grass sports field 10 of the various groups of artificial grass fibres, for example 2-2'-2'', wherein the permanent volume increase has been imposed on the additional material component in the group of artificial grass sports fibre 2'' by supplying heat, for example during the coating process. The artificial grass fibre 2'' thus transforms, as shown in FIG. 3b, and provides a damping layer ii above the carrier 1 (indicated at iii).

FIG. 4 shows yet another embodiment of an artificial mat comprising several groups of artificial grass fibres 2-2'-2''-2'''. The group of fibres 2 concerns a fibre having an ABA (or BAB) structure as described above obtained by means of a co-extrusion process, which has a reduced friction coefficient on the outer side to provide good sliding characteristics and/or an improved pile recovery capability (resilience) during play. The fibres 2' are soft, composite monofilament fibres for filling up the playing surface. The fibre group 2'' consists of foam fibres according to the invention, which have shock-absorbing properties, whilst the fibres 2''' are stiff fibres, which function to keep the field system open and prevent the artificial grass sports fibre from compacting.

The invention claimed is:
1. An artificial lawn for an artificial grass sports field comprising a mat comprising a carrier to which a plurality of spaced-apart groups of upright artificial grass fibres are attached, said carrier comprising at least two layers, wherein a first layer of the carrier is at least in part comprised of at least one additional, expandable material component incorporated therein in the form of a yarn, which additional material component expands vertically upward and imposes a permanent volume increase between the spaced-apart groups of upright artificial grass fibres on said part of the carrier when an external stimulus is exerted thereon, said vertical upward volume increase providing a damping layer to the artificial lawn.

2. The artificial lawn according to claim 1, wherein the additional material component is homogeneously distributed in the carrier.

3. The artificial lawn according to claim 1, wherein the carrier further includes an intermediate layer positioned between the first layer and the second layer, and the additional expandable material component is further incorporated in the second layer of the carrier.

4. The artificial lawn according to claim 1, wherein at least a first group of the artificial grass fibres is provided with at least one of said additional expandable material component.

5. The artificial lawn according to claim 4, wherein the additional material component is homogeneously distributed in the artificial grass fibre.

6. The artificial lawn according to claim 1, wherein the artificial grass fibre comprises an extruded fibre.

7. The artificial lawn according to claim 1, wherein the artificial grass fibre comprises a crosslinked fibre.

8. The artificial lawn according to claim 1, wherein the additional material component is a foam material.

9. The artificial lawn according to claim 8, wherein the foam material comprises a mixture comprising at least one polymeric material and at least one chemical blowing agent that is compatible with said mixture.

10. The artificial lawn according to claim 8, wherein the foam material has a closed cell structure after the permanent volume increase.

11. The artificial lawn according to claim 1, wherein the additional material component imposes the permanent volume increase on at least a part of the carrier under the influence of heat.

12. The artificial lawn according to claim 1, wherein the carrier comprises crosslinked materials.

13. The artificial lawn according to claim 4, wherein the artificial grass fibres of the first group are disposed between artificial grass fibres of a second group.

14. The artificial lawn according to claim 4, wherein the artificial grass sports fibres of the first group are disposed between artificial grass fibres of a third group.

15. The artificial lawn according to claim 1, wherein at least one layer of the carrier is woven.

* * * * *